(12) United States Patent   (10) Patent No.: US 7,502,346 B2
Han   (45) Date of Patent: Mar. 10, 2009

(54) METHOD OF PERFORMING HANDOFF IN WIRELESS ASYNCHRONOUS TRANSFER MODE NETWORK

(75) Inventor: Sang Youn Han, Seoul (KR)

(73) Assignee: LG Electronics Inc., Seoul (KR)

( * ) Notice: Subject to any disclaimer, the term of this patent is extended or adjusted under 35 U.S.C. 154(b) by 965 days.

(21) Appl. No.: 10/329,410

(22) Filed: Dec. 27, 2002

(65) Prior Publication Data

US 2003/0125029 A1    Jul. 3, 2003

(30) Foreign Application Priority Data

Dec. 29, 2001  (KR)  .............. 10-2001-0088568

(51) Int. Cl.
*H04Q 7/00* (2006.01)
(52) U.S. Cl. ............... 370/331; 370/310.2; 455/436
(58) Field of Classification Search ......... 370/328, 370/329, 331, 332, 333, 334, 395.1, 395.51, 370/395.52, 395.53, 310.1, 310.2; 455/436, 455/437, 438, 439, 442, 443, 444
See application file for complete search history.

(56) References Cited

U.S. PATENT DOCUMENTS

| 5,539,744 | A | * | 7/1996 | Chu et al. ................ 370/397 |
| 5,659,544 | A | * | 8/1997 | La Porta et al. ........... 370/312 |
| 5,717,689 | A | * | 2/1998 | Ayanoglu ................. 370/349 |
| 5,757,783 | A | * | 5/1998 | Eng et al. ................ 370/315 |
| 5,825,759 | A | * | 10/1998 | Liu ..................... 370/331 |
| 5,875,185 | A | * | 2/1999 | Wang et al. .............. 370/331 |
| 5,940,381 | A | * | 8/1999 | Freeburg et al. .......... 370/331 |
| 6,023,461 | A | * | 2/2000 | Raychaudhuri et al. ..... 370/331 |
| 6,041,358 | A | * | 3/2000 | Huang et al. ............. 709/238 |
| 6,230,013 | B1 | * | 5/2001 | Wallentin et al. .......... 455/436 |
| 6,381,232 | B1 | * | 4/2002 | Strawczynski et al. ...... 370/333 |
| 6,473,411 | B1 | * | 10/2002 | Kumaki et al. ............ 370/331 |
| 6,490,259 | B1 | * | 12/2002 | Agrawal et al. ........... 370/331 |
| 6,553,015 | B1 | * | 4/2003 | Sato .................... 370/331 |
| 6,643,279 | B1 | * | 11/2003 | Li et al. ................ 370/331 |
| 6,839,329 | B1 | * | 1/2005 | Sato et al. ............. 370/310.1 |
| 6,907,245 | B2 | * | 6/2005 | Ohlsson et al. ........... 455/442 |
| 6,954,790 | B2 | * | 10/2005 | Forslow ................. 709/227 |
| 7,177,646 | B2 | * | 2/2007 | O'Neill et al. ........... 455/450 |
| 7,242,678 | B2 | * | 7/2007 | O'Neill et al. ........... 370/349 |
| 7,362,727 | B1 | * | 4/2008 | O'Neill et al. ........... 370/331 |
| 7,424,295 | B2 | * | 9/2008 | Isobe et al. ............. 455/436 |
| 2001/0053138 | A1 | * | 12/2001 | Pillai et al. ............ 370/331 |
| 2002/0069278 | A1 | * | 6/2002 | Forslow ................. 709/225 |
| 2007/0298804 | A1 | * | 12/2007 | Tamura et al. ........... 455/437 |

FOREIGN PATENT DOCUMENTS

JP    2002209241 A  *  7/2002

* cited by examiner

*Primary Examiner*—Chi H. Pham
*Assistant Examiner*—Kevin Mew
(74) *Attorney, Agent, or Firm*—Ked & Associates, LLP

(57) ABSTRACT

Disclosed is a handoff method in a wireless ATM network. A method of performing a handoff in a network system having a first server managing a first area including a portion of first subcells of a first cell, and a second server managing a second area including another portion of the first subcells, comprises the steps of requesting, at the first server, for setting up a new communication path for a terminal which moves from the first area to the second area, setting up the new communication path at the second server, and performing a first handoff between the servers using the set-up communication path.

5 Claims, 5 Drawing Sheets

METHOD OF PERFORMING HANDOFF IN WIRELESS ASYNCHRONOUS TRANSFER MODE NETWORK

This application claims the benefit of the Korean Application No. P2001-88568 filed on Dec. 29, 2001, which is hereby incorporated by reference.

BACKGROUND OF THE INVENTION

1. Field of the Invention

The present invention relates to a method of performing a handoff in a wireless asynchronous transfer mode (ATM) network.

2. Background of the Related Art

Typically, in order to break from the communication service only for voice and to provide a multimedia service of diverse types of traffic communication services, diverse handoff methods are provided to guarantee the mobility of a user in a wireless ATM (WATM) network accompanying a radio network technology and a high-speed network technology.

Especially, in establishing a new communication path, it is required to develop a handoff method that may minimize occupation of network resources in comparison to the existing handoff technique.

Recently, with the appearance of a micro cell and a pico-cell, the radius of the cell becomes still smaller. Accordingly, as shown in FIG. 1, many cells share the same ATM switch to form a cluster.

In the above-described network environment, the cells inside the cluster are divided into crust cells and core cells. The crust cell indicates cells located in a boundary area of the cluster, and the core cell indicates cells whose adjacent cells are all of the crust cells.

Meanwhile, the handoff for guaranteeing the mobility of terminals based on the above-described cells is briefly classified into two kinds. An intra domain handoff is a handoff produced when any terminal moves between the core cells and an inter domain handoff is a handoff produced when any terminal moves between the crust cells.

FIG. 1 is a diagram illustrating a configuration of cells in a WATM network. FIG. 1 shows that one ATM switch is connected to many core cells and crust cells.

FIG. 2 is a diagram illustrating a structure of a conventional WATM network. FIG. 2 shows that each ATM switch is connected to crust cells of each cluster.

FIG. 3 is a diagram illustrating the conventional inter-domain handoff procedure.

Referring to FIG. 3, the term "Path_Setup_Req." denotes a path setup request message, and "Path_Setup_Ack." denotes a path setup completion acknowledgement message. Referring to FIG. 3, many request messages should be produced for the path setup, and also many acknowledgement messages are produced in response to the request messages. When a terminal moves between the core cells, the intra handoff is produced inside the one ATM switch. Accordingly, traffic data may be transferred from a service base station (Src_BS) providing the terminal with a radio access service to a newly added base station (New_BSs) without interruption.

On the contrary, when a terminal moves between the crust cells, the inter domain handoff is produced. Unlike the intra handoff, the inter domain handoff does not share the one ATM switch, a delay until a communication path is established between base stations of the crust cellscluster may be produced, and this may cause the deterioration of the communication quality due to data loss.

In order to overcome the above disadvantages, the inter domain handoff estimates the moving path of the terminal, and sets the communication path by preoccupying a communication resources for a neighboring ATM switch. Accordingly, the inter domain handoff may support the non-interrupted handoff like the intra domain handoff.

The conventional inter domain handoff technique estimates the moving path of the terminal, and preoccupies available resources of all the base stations. The preoccupied resources are required for the non-interrupted handoff, but causes waste of the communication resources.

Also, when the terminal moves along the boundary region of the cluster, the number of kinds of the communication resources is increased due to the frequent occurrence of the inter domain handoff Further, the number of messages produced for establishing the communication path is rapidly increased, and this causes the network load.

SUMMARY OF THE INVENTION

An object of the present invention is directed to a method of performing a handoff in a WATM network that substantially obviates one or more problems due to limitations and disadvantages of the related art.

Another object of the present invention is to provide an effective method of performing a handoff in a WATM network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a network structure comprises a first server managing a first area including a portion of first subcells of a first cell and a second server managing a second area including another portion of the first subcells and a portion of second subcells of a second cell.

According to another aspect of the present invention, a network structure comprises a first server managing a first area including a portion of first subcells of a first cell and a second server managing a second area including another portion of the first subcells and a portion of second subcells of a second cell, wherein handoffs are performed between the subcells of the areas and between the servers.

According to still another aspect of the present invention, a method of performing a handoff in a network system having a first server managing a first area including a portion of first subcells of a first cell, and a second server managing a second area including another portion of the first subcells, comprises the steps of requesting, at the first server, for setting up a new communication path for a terminal which moves from the first area to the second area, setting up the new communication path at the second server, and performing a first handoff between the servers using the set-up communication path.

According to further aspect of the present invention, a method of performing a handoff in a network system having a first server managing a first area including a portion of first subcells of a first cell, and a second server managing a second area including another portion of the first subcells, each of the first sever and the second server includes asynchronous transmission mode (ATM) for establishing a communication path of each cell, comprises the steps of requesting, at the first server, for setting up a new communication path for a terminal which moves from the first area to the second area, setting up, at the second server, the new communication path using a corresponding ATM switch, and performing a first handoff between the servers using the set-up communication path.

According to further aspect of the present invention, a method of performing a handoff in a wireless asynchronous transfer mode (WATM) network, comprises the steps of dividing a network configuration into an intra domain having an intra domain server for processing the handoff inside a cell and an inter domain having an inter domain server for connecting subcells located on a bound area between the cell and another cell, connecting the subcells to form one cell by the inter domain server, if an additional procedure for one crust cell is completed according to a moving path of a terminal, transmitting a re-routing path setup request message from the intra domain server to the inter domain server, after the inter domain server performs an ATM path setup procedure for the added crust cell, transmitting a re-routing path setup completion acknowledgement message to the intra domain server, and performing a soft handoff as the terminal successively moves through the inter domain region.

According to further aspect of the present invention, a method of performing a handoff in a wireless asynchronous transfer mode (WATM) network including a first intra domain region having a first intra domain server, a second intra domain region having a second intra domain server, and a second inter domain region having a second inter domain server, comprises the steps of connecting crust cells to form one cluster at the inter domain server, adding a first crust base station according to a request of a terminal at the first intra domain server, transmitting a first re-routing path setup request message to the inter domain server for the handoff between the domain servers at the first intra domain server, setting the re-routing path to support the handoff without interruption at the inter domain server, transmitting a re-routing path setup completion acknowledgement message to the first intra domain server at the inter domain server, setting the re-routing path to support the handoff without interruption at the inter domain server, and performing a soft handoff as the terminal successively moves through the inter domain region.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
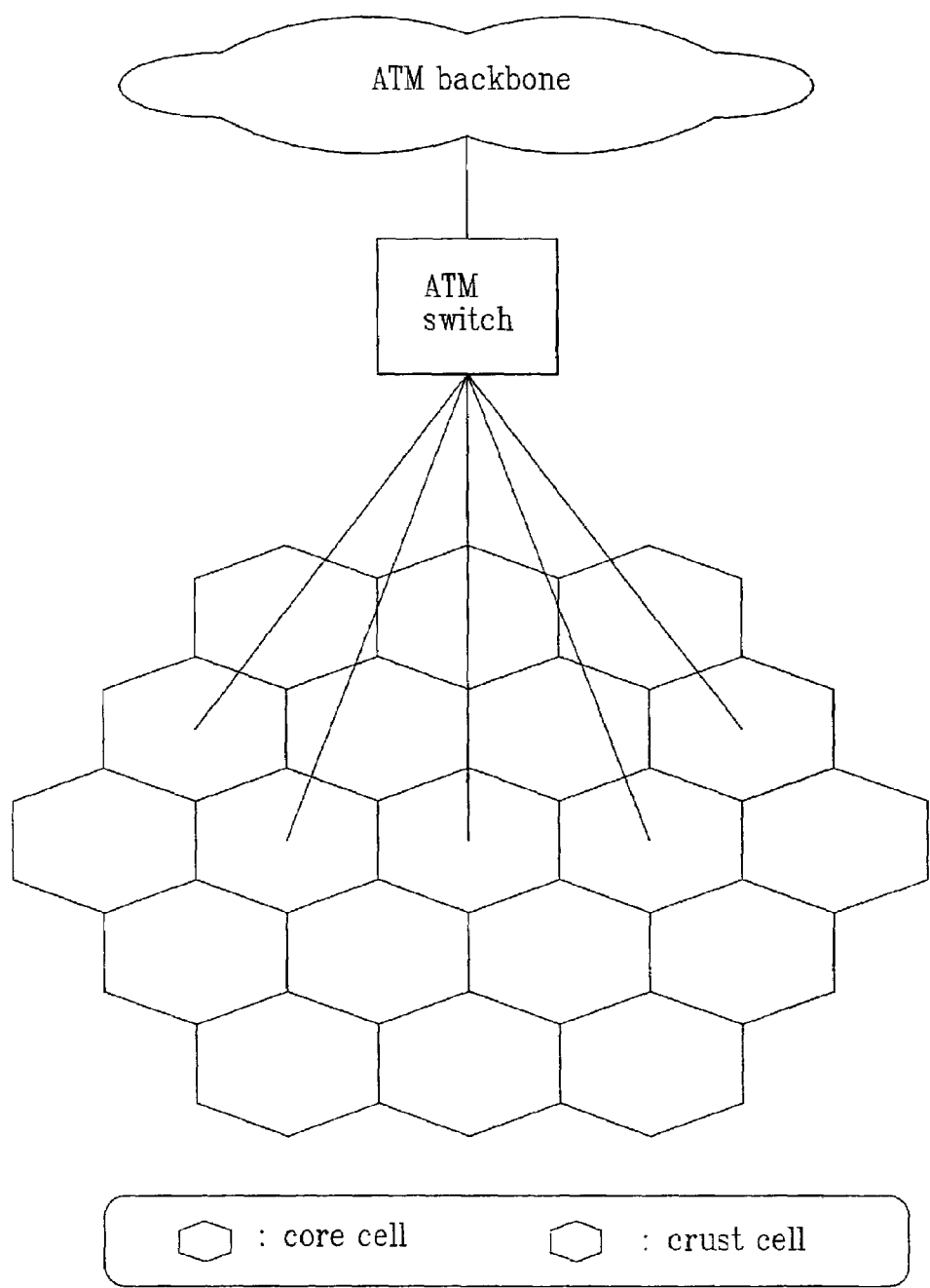
FIG. 1 is a diagram illustrating a configuration of cells in a WATM network.
Figure 2:
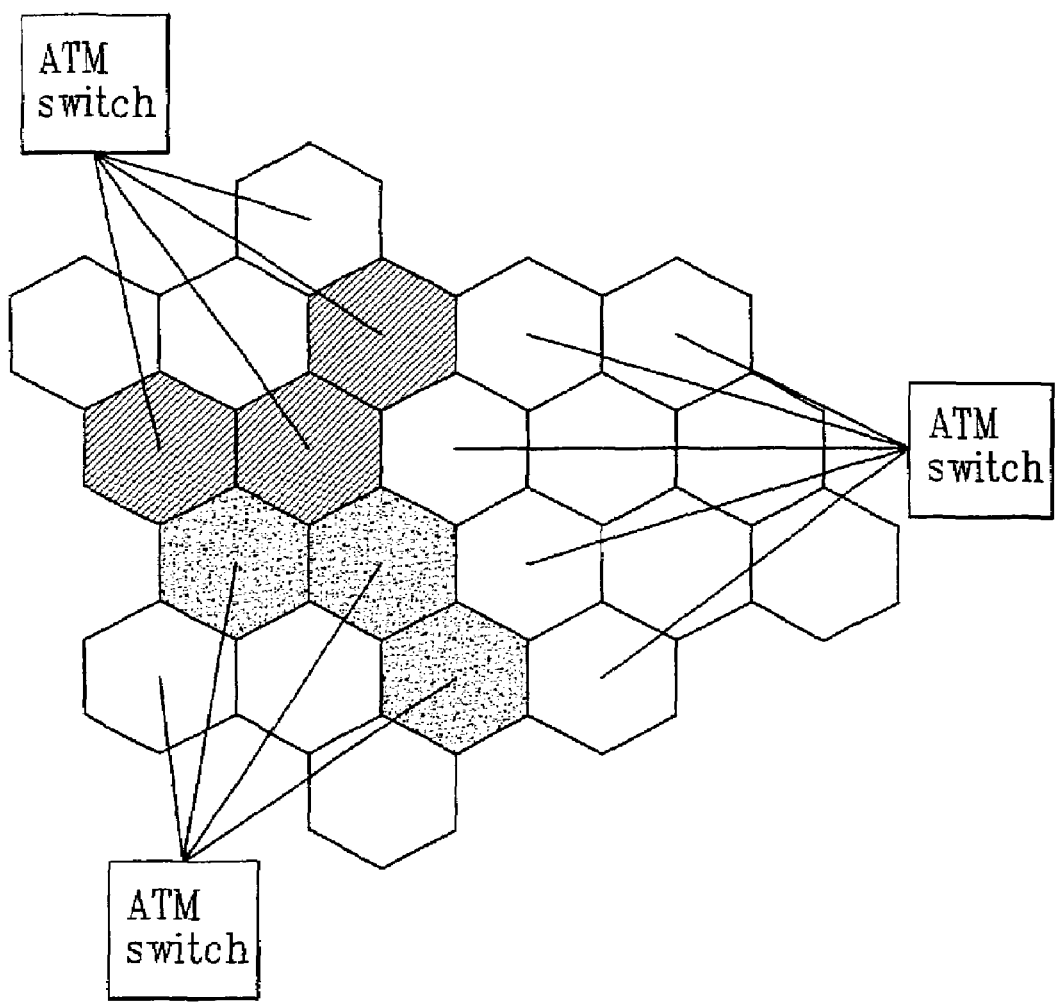
FIG. 2 is a diagram illustrating a structure of a conventional WATM network.
Figure 3:
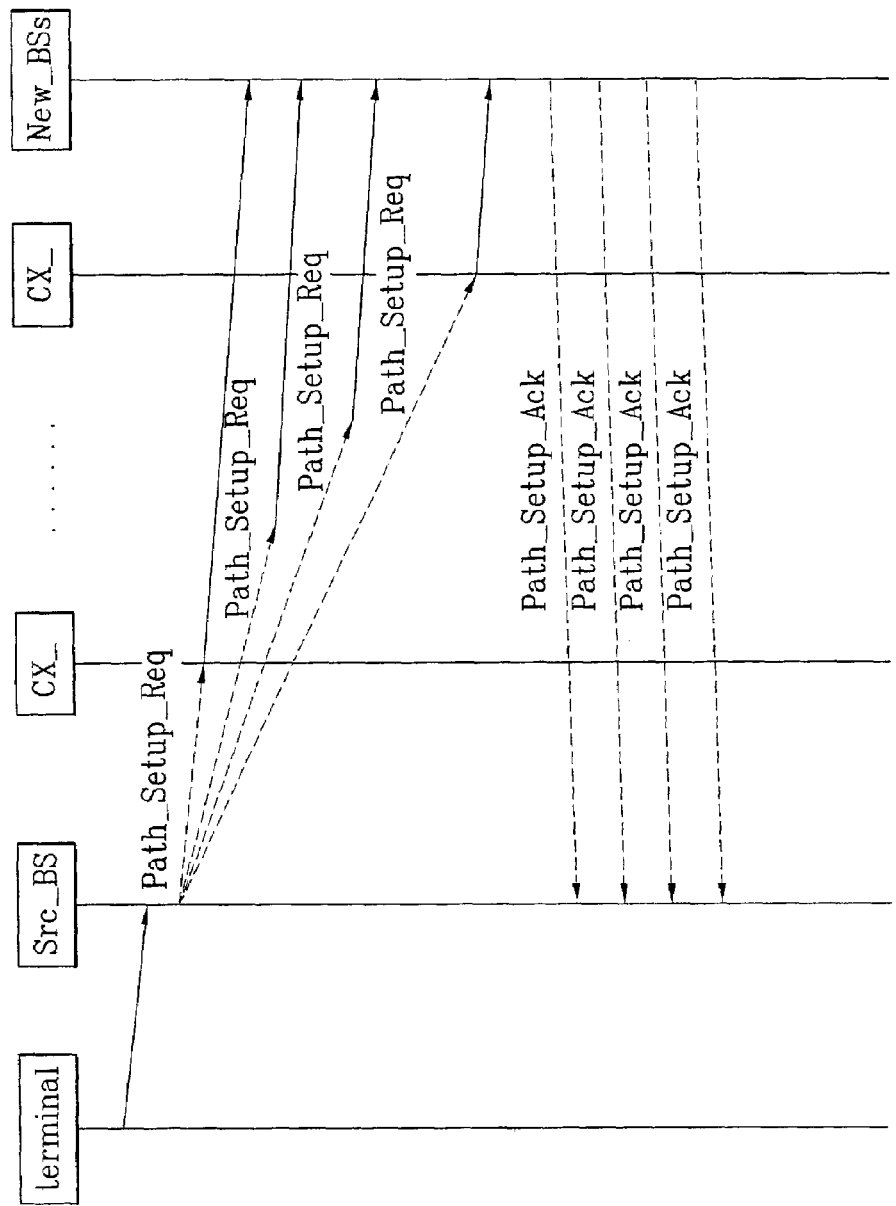
FIG. 3 is a diagram illustrating the conventional inter-domain handoff procedure.
Figure 4:
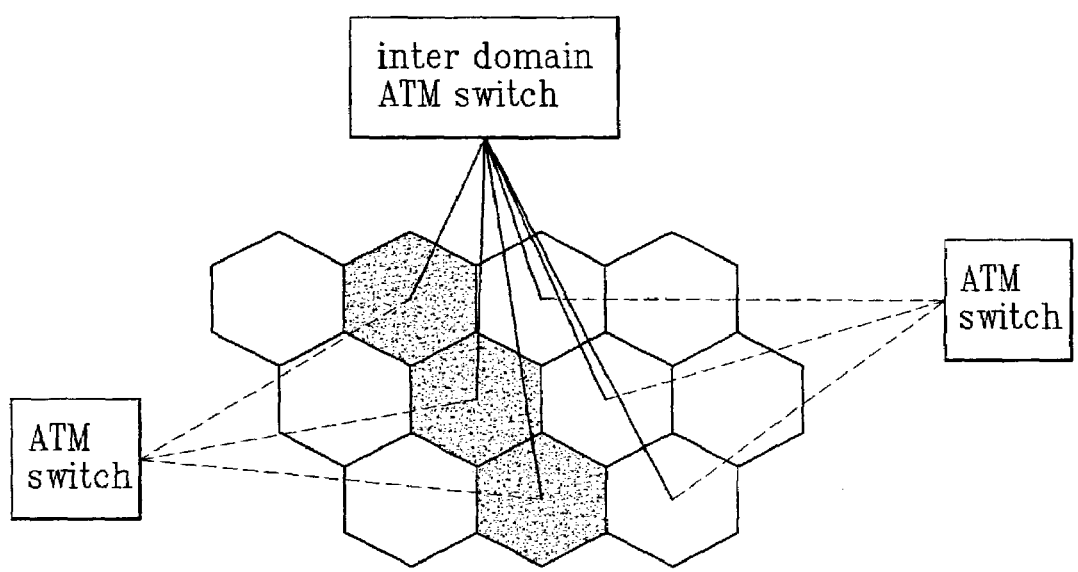
FIG. 4 is a diagram illustrating a network structure proposed according to the present invention.

FIG. 4 is a diagram illustrating a network structure proposed according to the present invention.

Referring to FIG. 4, an inter domain ATM switches are connected so as to interwork with intra domain ATM switches. The inter domain ATM switch switches an ATM communication path of each crust cell under the inter domain server. The intra domain server and inter domain server corresponds to base stations for providing to a terminal with a radio access service. Particularly, a plurality of the base stations may be replaced with the inter domain server, the base stations manage and control a plurality of terminals located on crust cells of different cells, respectively. According to the present invention, the network structure is divided into an intra domain and an inter domain. Also, servers for managing the respective domains are provided at the network. That is, cells of the intra domain is managed by an intra domain server, and cells of the inter domain is managed by an inter domain server. First, the intra domain server performs a handoff within a cluster. Also, the intra domain server requests a re-routing path setup to the inter domain server when a terminal moves from a core cell to a crust cell.

Meanwhile, the inter domain server is a server for connecting crust cells, and performs setting up the re-routing path using the inter domain ATM switch so as to perform the handoff between clusters in the same manner as the handoff within the intra domain.

According to a method of performing a handoff in a WATM network according to a preferred embodiment of the present invention, the WATM network is divided into the intra domain and the inter domain. Then, a server for managing the intra domain and performing the handoff within the cluster and the inter domain server for managing and connecting the crust cells are provided.

Thereafter, the crust cells are connected to form one cluster by the inter domain server.

In the above-described connection state of the crust cells, if an adding procedure of any new crust cell to which a terminal is moving from the core cell is completed, the intra domain server of the core cell transmits a re-routing path setup request message to the inter domain server of the crust cell for a soft handoff between intra domain server and inter domain server.

The inter domain server, which received the re-routing path setup request message, newly sets up an ATM path allocated to the terminal moving to the crust cell. Then, if the ATM path setup procedure is normally completed, the inter domain server transmits a re-routing path setup completion acknowledgement message to the intra domain server.

The intra domain server, which received the re-routing path setup acknowledgement message, the intra domain server releases the ATM path previously allocated to the moving terminal, and the soft handoff are performed between intra domain server and inter domain server by using the newly set-up ATM path. That is, the intra domain server requests for setting up the re-routing ATM communication path through an estimation of a moving path of the terminal.

As the terminal successively moves to the inter domain region, the soft handoff can be performed in the same manner as the handoff in the intra domain since the crust cells are connected as one cluster managed by the inter domain server.

Hereinafter, the above inter-domain handoff procedure will be explained in more detail with reference to FIG. 5.

Figure 5:
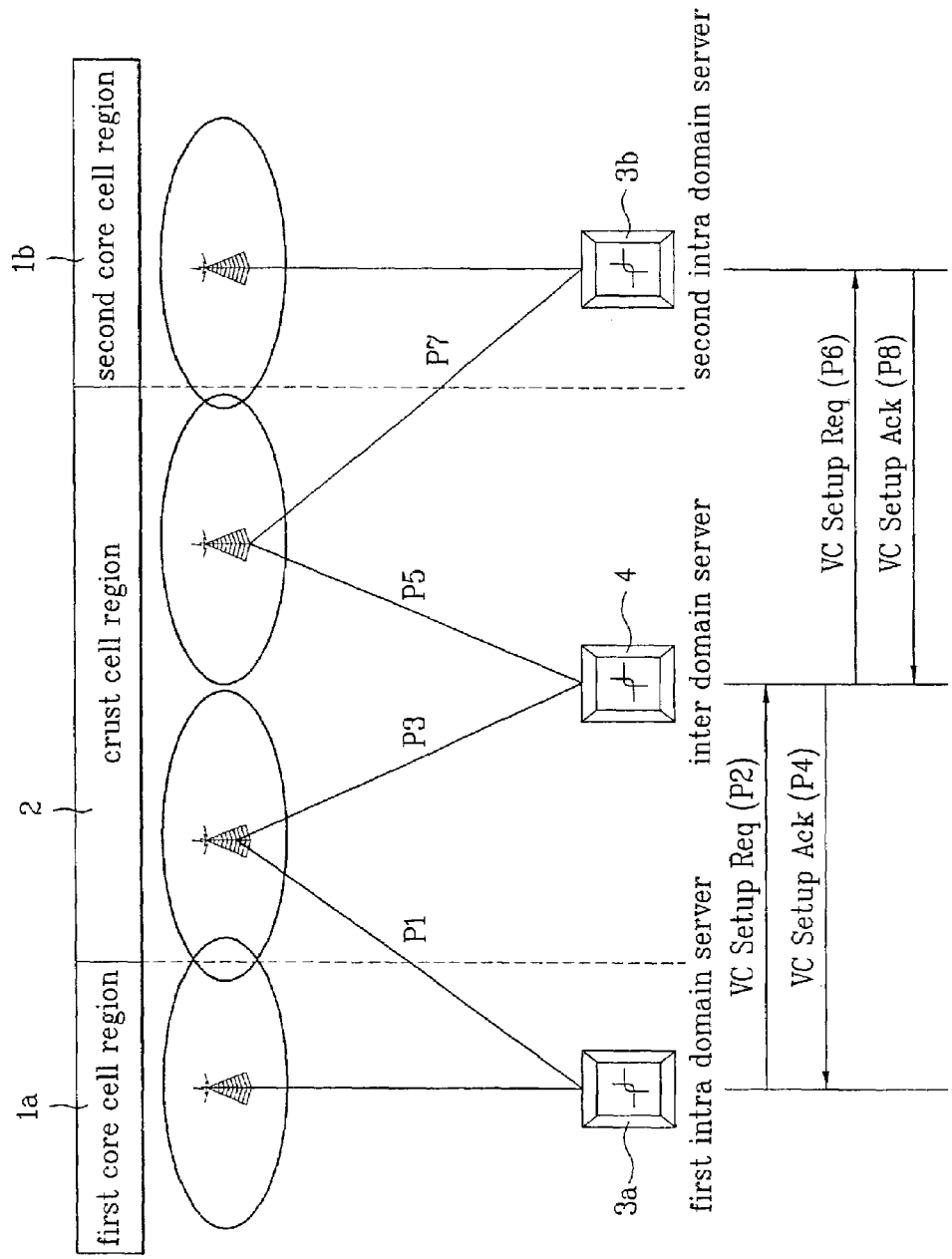
FIG. 5 is diagram illustrating an inter-domain handoff procedure proposed according to the present invention.

FIG. 5 is diagram illustrating an inter-domain handoff procedure proposed according to a preferred embodiment of the present invention.

If a terminal is moving from a core cell to a crust cell and a strength of a signal from the crust cell is greater than a threshold value, the first intra domain server 3*a* adds a crust cell (not illustrated) as an active set of a terminal according to the terminal's handoff request (P1). The active set indicates that the terminal may receive/transmit from the first intra domain server 3*a* or cells of the active sets. Then, if the adding procedure of the first intra domain server 3*a* to the active set is completed, the first intra domain server 3*a* transmits a re-routing path setup request (i.e., VC setup request; P2) message to the inter domain server 4 to set the re-routing path for the handoff between the domains.

If the re-routing path setup request message is received by the inter domain server 4, the inter domain server 4 sets the re-routing path using the inter domain ATM switch to support a soft handoff between intra domain server and inter domain server without interruption (P3). If the setup procedure of the re-routing path is completed, the inter domain server 4 transmits the re-routing path (i.e., VC) setup completion acknowledgement message to the first intra domain server 3*a* (P4). Thereafter, the soft handoff is performed between intra domain server and inter domain server.

That is, if the terminal continuously moves within the inter domain 4, the soft handoff in the same manner as the handoff within the first intra domain 4, not the complicated handoff procedure between the domains, is performed since the inter domain server 4 connects the crust cells each other to form one cluster.

In FIG. 5, if the soft handoff procedure between the crust cells is completed and the terminal requests the new addition of another crust cell (not illustrated) under the second intra domain server, the inter domain server 4 transmits the re-routing path setup request message to the second intra domain server 3*b* to set the re-routing path between the newly added crust cell B and the intra domain server 3*b*(P6).

The intra domain server 3*b*, if it receives the re-routing path setup request message, it sets the re-routing path to support the handoff without interruption (P7). If the setup procedure of the re-routing path is completed, the intra domain server 3*b* transmits the re-routing path setup completion acknowledgement message to the inter domain server 4(P8).

As described above, according to a preferred embodiment of the present invention, since the crust cells are managed as one group, the handoff process between the crust cells may be processed as the handoff between the core cells. Thus, the resource pre-occupancy for the non-interrupted traffic transmission during the inter domain handoff may be minimized.

Also, when the terminal successively moves along the crust cells of the inter domain region, the delay of the communication path setup caused by the conventional complicated handoff procedure between the crust cells may be minimized.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method of performing a handoff in a wireless asynchronous transfer mode (WATM) network, comprising:
    dividing a network configuration into an intra domain having an intra domain server for processing the handoff inside a cell and an inter domain having an inter domain server for connecting subcells located on a bound area between the cell and the another cell;
    connecting the subcells to form one cell by the inter domain server;
    transmitting a re-routing path setup request message from the intra domain server to the inter domain server when an additional procedure for one crust cell is completed according to a moving path of a terminal;
    after the inter domain server performs an ATM path setup procedure for the added crust cell, transmitting a re-routing path setup completion acknowledgement message to the intra domain server; and
    performing a soft handoff as the terminal successively moves through the inter domain region.

2. The method of claim 1, wherein the inter domain server is arranged in a subcell region, and the intra domain server is arranged in a core cell region excluded from the subcells among the cell.

3. A method of performing a handoff in a wireless asynchronous transfer mode (WATM) network including a first intra domain region having a first intra domain server, a second intra domain region having a second intra domain server, and a second inter domain region having a second inter domain server, comprising:
    connecting crust cells to form one cluster at the inter domain server; adding a first crust base station according to a request of a terminal at the first intra domain server;
    transmitting a first re-routing path setup request message to the inter domain server for the handoff between the domain servers at the first intra domain server;
    setting the re-routing path to support the handoff without interruption at the inter domain server;
    transmitting a re-routing path setup completion acknowledgement message to the first intra domain server at the inter domain server;
    setting the re-routing path to support the handoff without interruption at the inter domain server; and
    performing a soft handoff as the terminal successively moves through the inter domain region.

4. The method of claim 3, wherein the first re-routing path setup message is transmitted to the inter domain server after the handoff procedures between a core cell region and in a crust cell region are performed.

5. The method as claimed in claim 3, wherein the inter domain server is arranged in a crust cell region, and the intra domain servers are arranged in a core cell region.

* * * * *